United States Patent
Cathala

Patent Number: 5,630,307
Date of Patent: May 20, 1997

[54] METHOD AND A QUICK-OPENING WRAPPING FOR OBJECTS

[75] Inventor: Georges Cathala, Bernay, France

[73] Assignee: Generale de Grandes Sources, Paris, France

[21] Appl. No.: 382,037

[22] PCT Filed: Aug. 10, 1993

[86] PCT No.: PCT/FR93/00799

§ 371 Date: Feb. 27, 1995

§ 102(e) Date: Feb. 27, 1995

[87] PCT Pub. No.: WO94/03375

PCT Pub. Date: Feb. 17, 1994

[30] Foreign Application Priority Data

Aug. 10, 1992 [FR] France ............... 92 09879

[51] Int. Cl.[6] .................................... B65B 21/00
[52] U.S. Cl. ........................ 53/398; 53/412; 53/441
[58] Field of Search .............. 53/398, 412, 427, 53/434, 441, 461; 428/43, 136; 383/201, 116, 908

[56] References Cited

U.S. PATENT DOCUMENTS

| | | | |
|---|---|---|---|
| 3,264,272 | 8/1966 | Rees | 428/43 |
| 3,396,841 | 8/1968 | Copping. | |
| 3,403,779 | 10/1968 | Becker et al. | |
| 3,949,135 | 4/1976 | Vercauteren | 428/215 |
| 4,098,406 | 7/1978 | Otten et al. | 428/43 |
| 4,104,216 | 8/1978 | Clampitt. | |
| 4,371,583 | 2/1983 | Nelson | 428/358 |
| 4,391,952 | 7/1983 | Lybrand. | |
| 4,433,113 | 2/1984 | Woodward et al. | 525/327.5 |
| 4,833,017 | 5/1989 | Benoit | 53/441 |
| 4,841,711 | 6/1989 | Lems et al. | 53/441 |
| 4,899,521 | 2/1990 | Havens | 53/461 |
| 4,963,388 | 10/1990 | Benoit | 427/29 |
| 5,025,922 | 6/1991 | Havens | 53/461 |
| 5,273,809 | 12/1993 | Simmons | 53/441 |

FOREIGN PATENT DOCUMENTS

| | | | |
|---|---|---|---|
| 091612 | 10/1983 | European Pat. Off. . | |
| 409454 | 1/1991 | European Pat. Off. . | |
| 431810 | 6/1991 | European Pat. Off. . | |
| 451762 | 10/1991 | European Pat. Off. . | |
| 0372886 | 5/1988 | United Kingdom | 428/43 |

Primary Examiner—John Sipos
Assistant Examiner—Ed Tolan
Attorney, Agent, or Firm—Hazel & Thomas

[57] ABSTRACT

The invention relates to a method of making a quick-opening wrapping for packaging objects, characterized in that it comprises the following steps:

an embrittling agent is added to at least one extrudable plastics material;

a monolayer film is made from said composition by monoextrusion; and said objects are surrounded at least in part by a portion of said film, and tear initiator means are provided in said portion of the film whereby it is possible to tear said wrapping in the direction that is predetermined by said initiator.

13 Claims, 3 Drawing Sheets

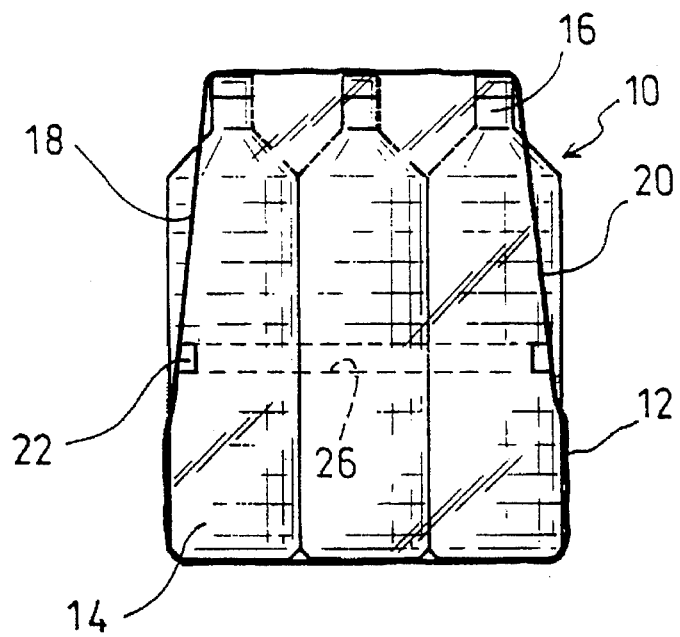
Fig_1
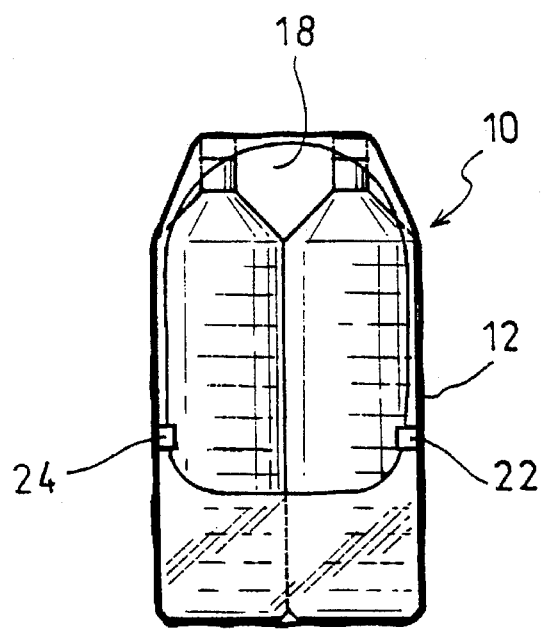
Fig_2

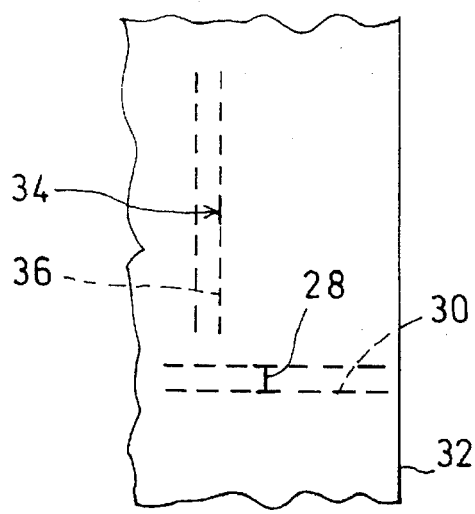
Fig_3
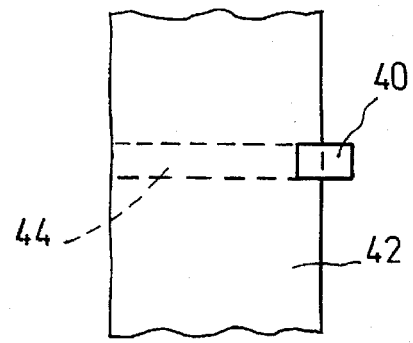
Fig_4
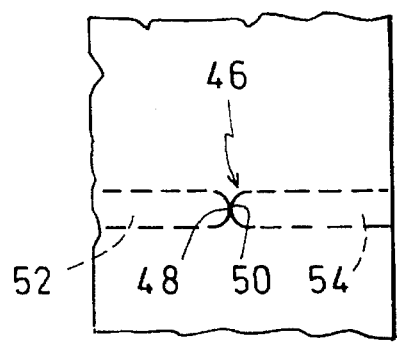
Fig_5
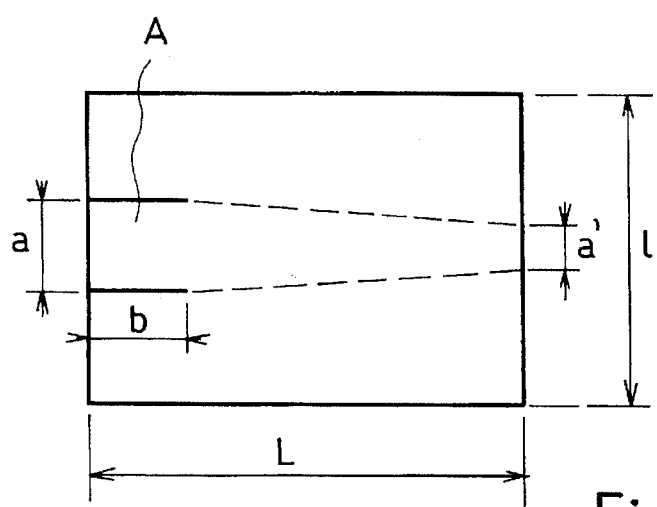
Fig_9

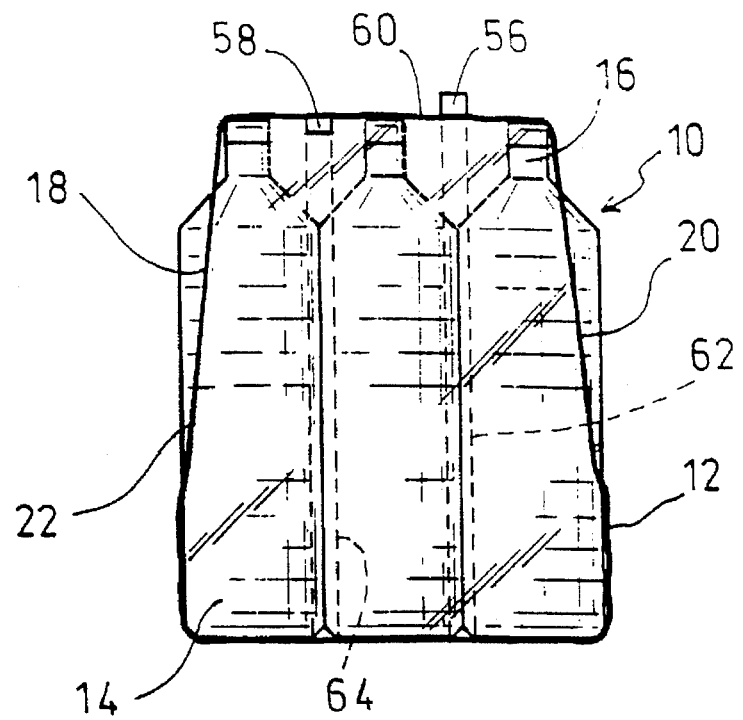
Fig_6
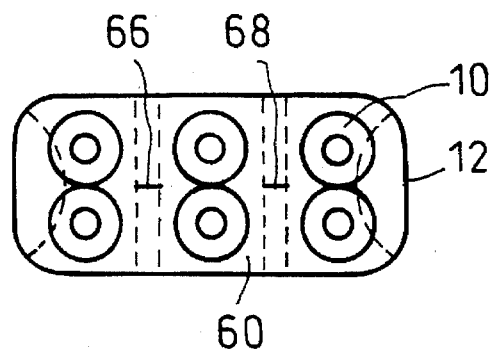
Fig_7
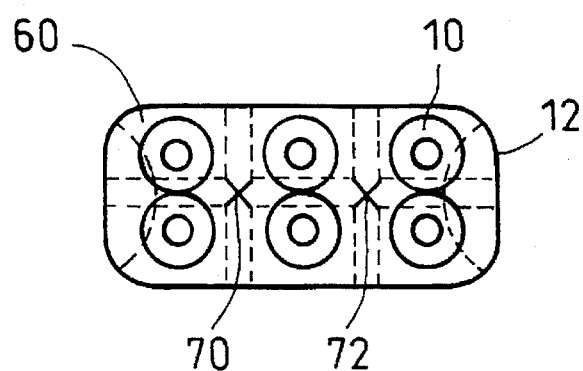
Fig_8

METHOD AND A QUICK-OPENING WRAPPING FOR OBJECTS

The present invention provides a method and a quick-opening plastics film wrapping for articles.

More precisely, the invention relates in particular to wrapping articles such as bottles, cans, jars, etc. in a plastics film that also allows the wrapping to be opened quickly by tearing to provide convenient access to the articles. To provide a clamping effect on the articles, the plastics film may be heat shrunk or stretched, and the wrapping is closed by heat-sealing or by adhesive.

It is becoming more and more common for articles to be offered for sale in packs comprising a certain number of the articles, for example bottles of mineral water are grouped together in sixes and are wrapped in a plastics film. The film allows the various articles to be held together very securely, and by construction it often has an opening at each end. When the user seeks to tear off the wrapping to take hold of an article, e.g. a bottle, this operation is not always very easy since, by definition, the plastics film used is very strong.

It is also advantageous to have a wrapping film available which is capable of being torn in a plurality of directions depending on the type of wrapping performed.

An object of the present invention is to provide a method and a wrapping of articles in a plastics film that is easily opened by tearing of the film so as to gain access to the wrapped articles while nevertheless ensuring that the considerable mechanical strength of the wrapping is maintained during handling of the wrapped articles.

To achieve this object, the method of making a quick-opening wrapping for packaging objects is characterized in that it comprises the following steps:

a weight percentage of an embrittling agent is added to at least one extrudable plastics material;

a monolayer film is made from said composition by monoextrusion; and said objects are surrounded at least in part by a portion of said film, and tear initiator means are provided in said portion of the film whereby it is possible to tear said wrapping in the direction that is predetermined by said initiator.

It will thus be understood that the wrapping has a composition that is homogenous overall, and that because of the presence of the embrittling agent, it is possible to tear the wrapping along a direction that corresponds to the particular implementation of the means forming the tear initiator. The tear direction is preferably either in the film extrusion direction, or else in the direction perpendicular thereto.

The means forming the tear initiator may be constituted by a pre-cut in the plastics film, or by the installation of a tear tongue close to an open edge of the film that forms the wrapping.

The mix of raw materials required for making the film is based on any substance that is (completely or partially) ionomerized with acid copolymers such as ethylene acrylic acid (EAA), ethylene methylacrylic acid (EMA), or others, optionally partially neutralized with cations, be they zinc, sodium, or others.

Preferably, the concentration by weight of the embrittling agent lies in the range 5% to 30%.

The quick-opening wrapping for objects is characterized in that it comprises a monolayer film of plastics material containing an embrittling agent and surrounding said objects at least in part, together with at least one tear initiator means whereby said wrapping can be tom by hand in at least one predetermined direction.

Other characteristics and advantages of the present invention appear more clearly on reading the following description of various implementations of the invention given as non-limiting examples. The description refers to the accompanying drawings, in which:

FIG. 1 is a side elevation view of a first embodiment of wrapping for wrapping together a group of bottles;

FIG. 2 is an end view of the FIG. 1 wrapping;

FIG. 3 is a diagram showing a first embodiment of the tear initiator;

FIG. 4 is a diagrammatic view showing a second embodiment of the tear initiator;

FIG. 5 is a diagrammatic view showing a third embodiment of the tear initiator;

FIGS. 6, 7, and 8 are respectively an elevation view and plan views of wrappings provided with other tear initiator means; and FIG. 9 is a diagram for explaining film tearability tests.

Before describing various implementations of the invention in detail, the principle thereof is described.

To make a plastics film for wrapping purposes, the starting material is a mix of plastics commonly used for making this type of film plus an embrittling agent which is preferably an ionomer. The plastics materials used may conventionally be radicular polyethylene, linear polyethylene, high density polyethylene, or a mixture of these components. The embrittling agent which is preferably constituted by an ionomer may be constituted, in particular, by the substances sold by Exxon under the names Iotek 4000, 4200, or 3110, or the substance sold by DuPont de Nemours under the trademark Surlyn 1601 or 1650.

The ionomer is preferably based on an acrylic acid or a methacrylic acid precursor neutralized by a cation which is preferably sodium or zinc.

More generally, the mix of raw materials necessary for making the film is made from any substance that is completely or partially ionomerized with acid copolymers such as ethylene acrylic acid (EAA), ethylene methylacrylic acid (EMA) or others, optionally partially neutralized with cations, be they zinc, sodium, or others.

The addition of the embrittling agent to the basic plastics material constituting the film makes it possible, after a tear initiator has been made in the film, to tear the film efficiently by hand in the direction that corresponds to the tear initiator and without requiring any effort. The film is made by monoextrusion of a mix comprising firstly a base compound constituted by radicular low density polyethylene optionally together with linear polyethylene or high density polyethylene or possibly a mixture of two or three of these compounds, and secondly by the embrittling agent.

The concentration by weight of the embrittling agent preferably lies in the range 5% to 30%. As demonstrated below, tests performed with a concentration by weight of embrittling agent lying in the range 15% to 25% have given very good results as to ease of tearing.

The monolayer film for wrapping is obtained by monoextrusion as explained above. The blow extrusion conditions are preferably the following.

The extrusion temperature lies in the range 160° C. to 220° C. depending on the melt index of the base resins used. The blow-up ratio lies in the range 1.5 to 5. The take-off ratio lies in the ratio 1.5 to 30 and preferably in the range 1.5 to 10. The thickness of the film preferably lies in the range 20 microns to 150 microns; the gap between the extrusion heads lies in the range 0.6 mm to 2.8 mm and preferably in the range 0.8 mm to 1.2 min. Finally, the melt index of the resins used lies preferably in the range 0.2 to 2 when it is desired to make use of the shrinkage forces of the film. Otherwise, the melt index may be as much as 15 for some resins.

The tearability of the film in a given direction is tested on a test piece of film as shown in FIG. 9. The width $l$ of the test piece is 360 mm and its length L is 500 mm for tear tests in the extrusion or "machine" direction, or the length is 300 mm for tear tests in the transverse direction, i.e. perpendicularly to the extrusion direction. The tear initiator A has a width $b$ of 20 mm and a length $a$ of 25 mm. The initiator A is pulled to the end of the test piece at a speed of about 250 mm per second. The width $a'$ of the tear at the opposite end of the test piece is measured, i.e. at a point 500 mm or 300 mm downstream in the tear direction. Five tests are performed for each tear direction. The tearability coefficient R is given by the ratio $a'/a$ and is expressed in percentage terms. The coefficient R must be greater than 30%.

There follow two examples of making the film of the invention.

EXAMPLE I

The composition by weight of the film was as follows:

| | |
|---|---|
| type 150 BG radicular low density polyethylene from Exxon: | 70%; |
| Iotek 3110 ionomer from Exxon: | 20%; |
| 0209AA type linear polyethylene from British Petroleum: | 10%. |

Extrusion conditions were as follows:

An extruder was used of diameter 120/25 D, having a 500 mm extrusion head and a gap of 1 mm. The blow-up ratio was 3.12 and the take-off ratio was 4.3. The thickness of the film was 67 microns, the extruded width was 2450 mm wide and the extrusion temperature in the furnace was 160° C. to 200° C.

Tests performed on that film gave the following results: R1 being tearability in the extrusion direction and R2 being tearability in the transverse direction.

| | R1 | R2 |
|---|---|---|
| Test 1 | 86 | 111 |
| Test 2 | 90 | 123 |
| Test 3 | 92 | 117 |
| Test 4 | 102 | 125 |
| Test 5 | 97 | 118 |

It can be seen that that film presents very good tearability in both directions, said tearability being well above standards.

EXAMPLE II

Composition by weight of the film:

150 GB radicular low density polyethylene from Exxon: 80%;

Iotek 3110 ionomer from Exxon: 20%.

The same extruder was used as in Example I, at a blow-up ratio of 2.55 and a take-off ratio of 7.16. The thickness of the film was 45 microns and its extrusion width was 2000 mm, at a rate of 300 kg.

Tear tests gave the following results:

| | R1 | R2 |
|---|---|---|
| Test 1 | 88 | 48 |
| Test 2 | 87 | 76 |
| Test 3 | 88 | 96 |
| Test 4 | 86 | 58 |
| Test 5 | 88 | 85 |

It can be seen that the results of tear tests in both directions were likewise well above the required standards.

With reference now to FIGS. 1 and 2, a first embodiment of wrapping of the invention is now described. In these figures, six bottles of mineral water are shown by way of example, given overall reference 10, and they are wrapped in a plastics film referenced 12. As is well known, the plastics film 12 is formed to fit closely round the bottom ends 14 of the bottles, and also round their top ends 16 so as to hold together the set of six bottles that are clamped closely against one another. As can be seen more clearly in FIG. 2, during this operation, the plastics film leaves two openings 18 and 20 at respective ends of the wrapping above the bottom portions 14 of the bottles, in this particular example. As can be seen in the figures, tear initiators 22 and 24 are fixed on, which tear initiators are constituted by respective tongues of paper or of plastics that are glued or heat-sealed to the plastics film itself. As can be seen, these initiators are preferably fixed to the edges of the orifices 18 or 20. Because the plastics material from which the wrapping is made has been embrittled, the user merely needs to grasp one of the tear initiators to be able to pull easily on the plastics film which tears along the strip represented by dashed lines 26 in FIG. 1. It should be understood that the dashed lines do not, in any way, represent pre-cuts.

FIG. 3 shows another embodiment of the tear initiator. It is constituted by a pre-cut portion 28 that is H-shaped, with the initiator 28 thus defining a tear direction 30 that extends transversely relative to the extrusion direction of the film 32. The H-shaped tear initiator 34 may be formed parallel to the extrusion direction, i.e. in the longitudinal direction of the film, thus giving a tear 36 in the longitudinal direction of the plastics film. Opening is obtained by using the finger to push in the pre-cut portion and then by pulling on the tongue that is released in this way.

FIG. 4 shows an embodiment of the tear initiator forming means corresponding to those shown in FIGS. 1 and 2. This initiator is constituted by a plastics or paper tongue 40 stuck or heat-sealed to the plastics film. A portion of the tongue projects beyond the edge of the film 42 so as to be easy to grasp in the hand. Dashed lines 44 show the tear direction that is predetermined by the position of the tongue.

FIG. 5 shows another embodiment of the tear initiator which is again constituted by a pre-cut 46, this time in the form of two tangential semicircles 48 and 50. This pre-cut thus serves to define two opposite tear directions 52 and 54.

FIG. 6 shows a variant of the embodiment of FIGS. 1 and 2. The tear initiator tongues 56 and 58 are fixed to the top portion 60 of the wrapping. Tearing then takes place vertically as represented by lines 62 and 64.

FIGS. 7 and 8 show two other embodiments of the tear initiator made by forming pre-cuts in the top portion 60 of the wrapping. In FIG. 7, the pre-cuts 66 and 68 are H-shaped and enable the wrapping to be torn vertically along its main faces. In FIG. 8, the pre-cuts 70 and 72 are X-shaped and enable the wrapping to be torn vertically along its main faces or horizontally along the length of the wrapping. The tear directions preferably correspond to the extrusion direction of the film and to the transverse direction.

It will be understood that the extruded plastics film includes the embrittling agent in uniform manner. The tear initiator may therefore be made anywhere within the portion of the film that forms the wrapping, as a function of particular requirements associated with the objects and with the shape of the wrapping.

It should be underlined again that the fact of introducing the embrittling agent directly into the base plastics material makes it possible to obtain a wrapping film by monoextrusion, thereby very significantly reducing the cost of fabricating it.

The base polymer and the ionomer taken independently do not satisfy the requirements of cohesion and of easy tear propagation. In contrast, in surprising manner, by mixing these two substances in the proportions given, it is possible to obtain that result. It appears that this effect of synergy makes it possible to obtain controlled crystallization, together with two orientations, stress concentration, heterogeneity in the final product, and consequently the creation of intrinsic rupture initiators.

In the above description, particular attention has been paid to wrapping bottles. Nevertheless, it will be understood that the wrapping of the invention can be used for wrapping numerous other articles such as pallets carrying groups of objects that have already been wrapped, or alternatively for wrapping single objects of large size.

What is claimed is:

1. A method of making a quick-opening wrapping for packing objects, comprising the steps of:

preparing a composition by adding an embrittling agent to at least one extrudable plastics material, the concentration by weight of said embrittling agent being within the range of 5% to 30%;

monoextruding said composition by blow extrusion with a take-off ratio within the range of 1.5 to 30 and a blow-up ratio within the range of 1.5 to 5, whereby the extruded film is tearable in the extrusion direction and in a direction orthogonal to the extrusion direction; and surrounding at least in part said objects by a portion of said film, and providing tear initiator means in said portion of said film whereby it is possible to tear said wrapping in the direction that is predetermined by said initiator.

2. The method according to claim 1, wherein said embrittling agent is an ionomer based on an acid copolymer.

3. The method according to claim 2, wherein said ionomer is based on an acrylic or a methacrylic acid precursor neutralized by cations.

4. The method according to claim 3, wherein said cations are selected from the group consisting of zinc and sodium cations.

5. The method according to claim 2, wherein said acid copolymer is selected from the group consisting of ethylene acid and ethylene methacrylic acid.

6. The method according to claim 5, wherein said acid copolymer is at least partially neutralized with zinc or sodium cations.

7. The method according to claim 1, wherein said base plastics material is constituted by a plastics material selected from the group consisting of radicular polyethylenes, linear polyethylenes, and high density polyethylenes.

8. The method according to claim 7, wherein the plastics material is constituted by a mixture of at least two of said compounds.

9. The method according to claim 1, wherein the melt index of the components used lies in the range 0.2 to 15.

10. The method according to claim 9, wherein the melt index of the components used lies in the range 0.2 to 2, whereby said film is shrinkable.

11. A method of making a quick-opening wrapping for packing objects, comprising the steps of:

preparing a composition by adding an embrittling agent to at least one extrudable plastics material, the concentration by weight of said embrittling agent being within the range of 15% to 25%;

monoextruding said composition by blow extrusion with a take-off ratio within the range of 1.5 to 30 and a blow-up ratio with in the range of 1.5 to 10, whereby the extruded film is tearable in the extrusion direction and in a direction orthogonal to the extrusion direction; and surrounding at least in part said objects by a portion of said film, and providing tear initiator means in said portion of said film whereby it is possible to tear said wrapping in the direction that is predetermined by said initiator.

12. The method according to claim 1, wherein the thickness of the monoextruded film is within the range of 20 to 150 microns.

13. The method according to claim 11, wherein the thickness of the monoextruded film is within the range of 20 to 150 microns.

* * * * *